J. G. FRIBERG.
HORSE COLLAR FASTENER.
APPLICATION FILED JAN. 7, 1911.
1,000,793.
Patented Aug. 15, 1911.
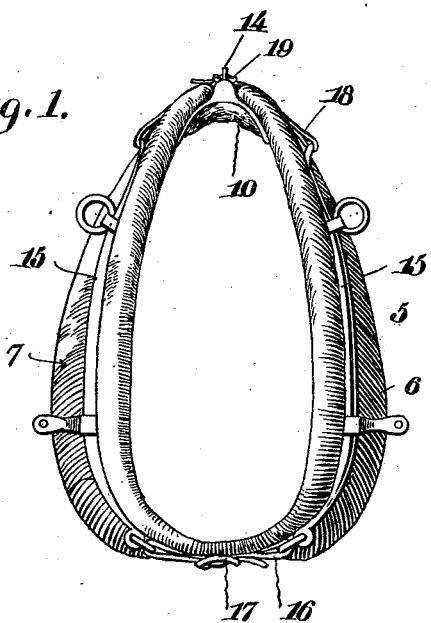
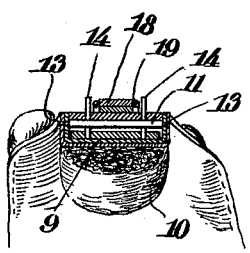
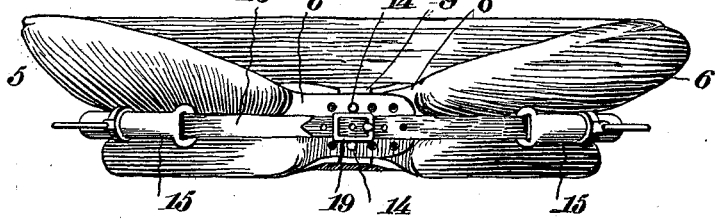
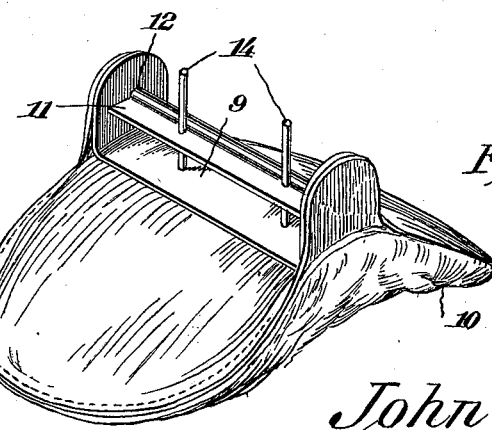
Witnesses
Inventor
John G. Friberg.
By Victor J. Evans.
Attorney

UNITED STATES PATENT OFFICE.

JOHN G. FRIBERG, OF MAIDEN ROCK, WISCONSIN.

HORSE-COLLAR FASTENER.

1,000,793.

Specification of Letters Patent. Patented Aug. 15, 1911.

Application filed January 7, 1911. Serial No. 601,306.

*To all whom it may concern:*

Be it known that I, JOHN G. FRIBERG, a citizen of the United States, residing at Maiden Rock, in the county of Pierce and State of Wisconsin, have invented new and useful Improvements in Horse-Collar Fasteners, of which the following is a specification.

The invention relates to a horse collar, and more particularly to fasteners for horse collars.

The primary object of the invention is the provision of a collar of this character in which the ends thereof may be adjusted relatively to each other for the increasing or decreasing of the size of the same, and fastened, so that there will be no possibility of the said collar becoming loose or removed from the neck of a draft animal.

Another object of the invention is the provision of a fastener of this character which is simple of construction, and that may be readily attached to and removed from horse collars of ordinary construction, and that will be reliable and efficient in operation, and inexpensive in manufacture.

With these and other objects in view, the invention consists in the construction, combination and arrangement of parts, as will be hereinafter more fully described, illustrated in the accompanying drawing, and pointed out in the claims hereunto appended.

In the drawing: Figure 1 is a front elevation of a horse collar with the fastener carried thereby. Fig. 2 is a vertical longitudinal sectional view through the same. Fig. 3 is a top plan view. Fig. 4 is a detail perspective view of the fastener removed from the collar.

Similar reference characters indicate corresponding parts throughout the several views of the drawing.

Referring to the drawing by numerals, the horse collar comprises a body 5, preferably of the ordinary well-known shape and includes a leather cover 6 for retaining the usual padding 7. However, the covering 6 may be made of any other suitable material if the occasion requires. The ends of the body 5 are in the form of straps 8 for the attachment thereof to a fastener, as will be hereinafter more fully described. This fastener comprises a substantially U-shaped metallic base plate 9, suitably fixed to and disposed transversely of an oval-shaped pad 10. The base 9 supports a cross bail 11, preferably in the form of a flat bar provided at one longitudinal edge with an elongated eye 12, through which is passed a pivot pin 13, the same being also engaged in the upturned ends of the base 9, whereby the bail may be swung to opened or closed position. Projecting from opposite faces of the bail 11 are spaced tines or pins 14. Thus, when the bail 11 is in closed position, the tines 14 projecting from the under face thereof are adapted to engage in suitable apertures formed in the strap 8 at one end of the body 5 of the horse collar, and the strap 8 at the other end of the said collar will be engaged with the tines 14 projecting upwardly from the outer face of the said bail, thereby securing the collar about the neck of an animal.

Mounted upon the horse collar are the usual hames 15, the same being connected together at their lower ends by an ordinary strap and buckle 16 and 17, respectively, while the upper ends thereof are connected in a like manner by an ordinary strap and buckle 18 and 19, respectively, the upper strap 18 being adapted to overlie the bail 11 between the upwardly projecting tines 14 thereof. Thus it will be seen that the said bail 11 will be held against opening movement and in this manner, the collar will be held fast about the neck of the animal, the pad 10 being adapted to rest against the upper portion of the neck of the animal when the collar is about the same.

It is evident that on opening the bail 11 of the fastener, that is to say, shifting the bail at right angles to the base 9, the strap ends will be disengaged from the tines 14, thus freeing the strap ends of the horse collar, whereby it may be conveniently removed from about the neck of the animal. The end straps 8 of the horse collar are provided with a series of openings, so that the said straps may be adjusted on the tines 14 for increasing or decreasing the size of the collar, as the occasion may require.

When the end straps 8 of the horse collar are engaged with the tines 14, the same exert pulls in opposite directions, and the tines 14 depending from the under face of the bail when closed will engage with the base plate 9, thus preventing the said bail from swinging in one direction to open position. It is evident that these tines 14 are mounted on the bail spaced from the axis of movement thereof, thus assuring the tines 14 depending from the bail contacting with the base 9 when said bail is in closed position.

What is claimed is:

1. A fastener for horse collars, comprising a U-shaped base plate, and a swinging bail pivotally mounted in the base and having oppositely extending tines adapted for engagement with the end straps of such horse collar, whereby the latter may be fastened about the neck of an animal.

2. A fastener for horse collars, comprising a U-shaped base plate, a swinging bail pivotally mounted in the base and having oppositely extending tines adapted for engagement with the end straps of such horse collar, whereby the latter may be fastened about the neck of an animal, and a pad connected to the said base plate to rest upon the neck of such animal.

3. A fastener of the class described, comprising a pad, a base carried thereby, a swinging bail pivoted to and disposed above the base, and means projecting from opposite faces of the bail for adjustable engagement with the end straps of a horse collar, whereby the same may be secured about the neck of an animal.

In testimony whereof I affix my signature in presence of two witnesses.

JOHN G. FRIBERG.

Witnesses:
 BEVERLY WHITE,
 C. W. CARPENTER.

---

Copies of this patent may be obtained for five cents each, by addressing the "Commissioner of Patents, Washington, D. C."